Figure 1:
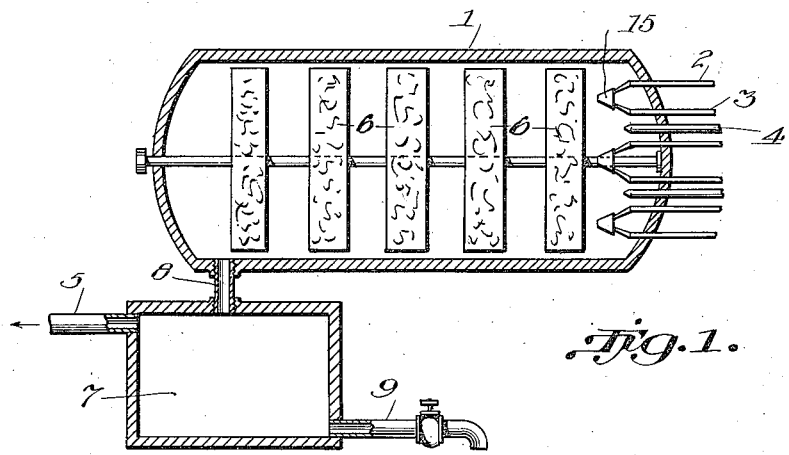

A. H. NEY.
PROCESS AND APPARATUS FOR REDUCING UNSATURATED MATERIALS.
APPLICATION FILED JUNE 7, 1912.

1,185,704.

Patented June 6, 1916.

Adolphus Henry Ney
Inventor:
By Nathaniel L. Foster
Atty.

Witnesses:
A. A. Wells
D. David Lubetzki

UNITED STATES PATENT OFFICE.

ADOLPHUS HENRY NEY, OF HASBROUCK HEIGHTS, NEW JERSEY, ASSIGNOR, BY MESNE ASSIGNMENTS, TO HYDROGENATED OIL COMPANY, OF NEW YORK, N. Y., A CORPORATION OF NEW YORK.

PROCESS AND APPARATUS FOR REDUCING UNSATURATED MATERIALS.

1,185,704.                 Specification of Letters Patent.       Patented June 6, 1916.

Application filed June 7, 1912. Serial No. 702,367.

*To all whom it may concern:*

Be it known that I, ADOLPHUS HENRY NEY, a resident of the United States, who has declared his intention to become a citizen thereof, of Hasbrouck Heights, in the county of Bergen and State of New Jersey, have invented certain new and useful Improvements in Processes and Apparatus for Reducing Unsaturated Materials, of which the following is a specification.

This invention relates to a process of hydrogenating oils, and relates in particular to the method of treating glycerids and similar oily bodies containing unsaturated compounds, with hydrogen gas or other gaseous mediums containing hydrogen or similar reducing material in the presence of nickel or other catalyzers, as well as to an apparatus suitable for carrying out said process, all as hereinafter particularly described and claimed.

The generally accepted theory for the explanation of the catalytic reactions is the formation of certain unstable intermediate compounds of the catalyst with one or more of the reagents. In the instance of the catalysts, like nickel, the formation and decomposition alternate of a nickel-hydrogen compound or hydrid is hypothetically presumed. It is immaterial for the purpose of the present consideration whether these hydrids are stable for any length of time under certain conditions or whether they always instantaneously are formed, decompose and are reformed. In the technical application of catalytic reduction the fact alone is of importance that under certain favorable conditions the formation of the hydrid takes place and subsequently an exchange or transfer of the hydrogen atom from the hydrid to the organic body. In considering the dynamics of this reaction it is apparent that the hydrogenation of organic bodies must take place in a series of distinct phases. When the organic body first comes in contact with prepared catalyst in the presence of hydrogen, an instantaneous transfer of the stock of hydrogen already present in the catalyst takes place. Subsequently if the catalyst is again exposed to the influence of a fresh supply of hydrogen a reformation or regeneration of hydrid follows, followed by a renewed transfer of hydrogen to fresh material until all unsaturated bodies have become saturated ones. It is however clear that this is only the case if the catalyzer is permanently kept free of the organic material or where the organic body can be maintained in form of a true vapor or gas under the conditions of hydrogenation.

In case of organic material incapable of being transformed into the vaporous or gaseous state, entirely different conditions prevail. When the material, such as a mixture of the glycerids of unsaturated fatty acids, meet first the catalyzer, the first of the above mentioned phases takes place. However, as the hydrogenated material and the excess of the original product keep on flowing over the catalyzer or reaching it in some other way, these bodies are not immediately removed as in case of a true vapor or gas, but rather on account of certain physical properties as viscosity, surface adhesion and capillary energy, adhere strongly and tenaciously to the catalyst or its carrier thus preventing or greatly impeding the reformation of the hydrid due to the sealing up of the surfaces of the catalyst and preventing the access of the hydrogen to it. In a greater or lesser measure conditions like this exist under all the methods at present proposed for a technical execution of the hydrogenation process, and obviously this difficulty must to an extent, always exist in case of the hydrogenation of certain compounds, like oils and fats, as it is commercially unfeasible to bring these bodies into the state of a true vapor or gas.

It has been proposed heretofore to treat oils with hydrogen in the presence of catalyzers, by the process of agitating the oil in the presence of said catalyzers and hydrogen gas, or even by the method of allowing the oil to flow past or through a mass of stationary catalyzer in the presence of hydrogen under certain conditions. These methods do not take sufficiently into consideration the fact that the viscosity, etc., of the oil causes the catalyzer to be covered with a substantially impervious film, which in a large measure, prevents access of hydrogen to the catalyzer, and therefore prevents the rapid union of the hydrogen with the unsaturated body. In further explanation of this condition, it briefly may be stated that when a catalyzer, such for example as nickel, reduced from the oxid by hydrogen gas, is first treated with an oil, the combined hydrogen which is perhaps present as the hydrid, is taken up by the oil leaving the catalyzer impoverished with respect to hydrogen. Moreover, the catalyzer is at this time coated with the oil and therefore sealed away from the hydrogen atmosphere, so that the gas no longer has access to it. Therefore the hydrid, which is the body apparently acting to reduce or saturate the unsaturated bodies, is no longer capable of formation.

The present invention has for its object the treatment of the catalyzer or the coordination of the two operations of contacting the oily material and an elastic fluid such as steam with the catalyzer in such a manner that the latter is constantly denuded of any substantial film of saturated oil, and thereby rendered continuously active (or revivified) by the constant reformation of the active hydrid material.

By reference to the accompanying illustrative drawings, it will be seen in what manner an embodiment of the invention may be carried out.

Figure 2:
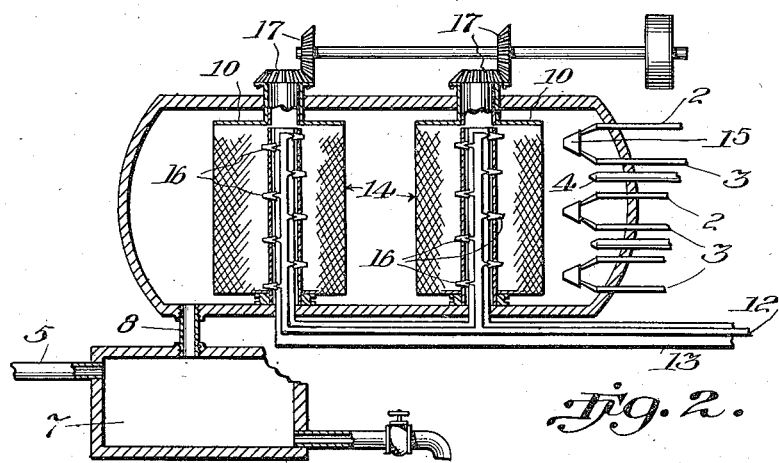
Figure 3:
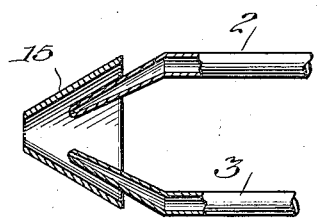

In the accompanying drawings, which are purely diagrammatic, Figures 1 and 2 show vertical sections of a treating chamber. Fig. 3 is a detail section of an improved form of the atomizer nozzle.

In the drawings, 1 is a chamber having a steam inlet pipe 2, and an oil inlet pipe 3 and mixing cap 15 (or preferably a plurality of such). The discharge ends of these pipes, as shown in Fig. 3, are arranged to produce a complete atomization of the oil, reducing it to a fog.

4 is an inlet pipe for supplying hydrogen to the chamber, and 5 is an outlet pipe for the removal of the spent gases.

6 is a mass of catalytic material such as reduced nickel, copper, iron, cerium, palladium, platinum and their oxids or salts according to circumstances. The catalyzer is preferably arranged in a plurality of layers or series of baskets as shown in Fig. 1.

7 is a chamber placed beneath the treating tank 1, to receive the hydrogenated oil, and connected to the chamber 1, by the pipe 8.

9 is an exhaust pipe, connected with the receiving chamber 7, which may be used to produce a partial vacuum in the chamber 7 as desired. In Fig. 2, the steam or other atomizing fluid and oil inlet pipes 2 and 3 are shown in multiple, so as to produce a plurality of atomizing jets. The hydrogen inlets and outlets are shown as 4 and 5 respectively. In this case, the catalyzer is placed in a drum 10, which is capable of being rotated by the gears 17, and which is made of some porous material, such as wire netting or the like, as shown at 14, and the atomized oil, or oil fog, is allowed to impinge, from the stationary atomizers 16, at a definite velocity, upon the catalyzer held in place, by the foraminous periphery of the drum, which velocity is adjusted with respect to the speed of revolution of the drum, so as to produce any desired degree of impregnation of catalyzer by the fog, or atomized oil. The speed may, however, be so regulated that the oil-fog penetrates only a moderately short distance beneath the peripheral surface of the drum, and is then ejected by centrifugal force, the oil being in a non-vaporized or liquid state (the catalyzer of course, being maintained below the boiling or decomposing point of the product). This operation produces a novel action of extreme importance, for owing to the relatively slight centrifugal force exerted upon the oil-fog, its penetrative properties are inherently good, while as coagulation of the oil or granulation of the fine particles occurs so that a concrete drop or particle is produced, then centrifugal action manifests itself and the concrete oil particle is ejected from the drum. Hence it follows that while the catalyzer is freely in contact with the fog particles in the presence of the hydrogen gas, the discrete or concrete particles of oil are removed from its surfaces by centrifugal action, and thereby the catalyzer is revivified or prevented from becoming sealed away from the hydrogen gas, and its action upon the oil is constant and effective. Thus, the reformation of the hydrids (or other action produced by the contact of the catalyzer and hydrogen), is continually in progress. A catalyzer of substantially constant hydrogen (or hydrid) content is secured, and the uncertain operation of the methods heretofore practiced as above recited, does not obtain.

In Fig. 2, 12 and 13 represent oil and steam injecting pipes respectively, whereby if desired, the oil fog may be entered into the interior of the catalyzer drum, so that the fog has to penetrate from the center of the drum to the periphery. The oil is finely divided or converted into an oil fog by the atomizing action of the atomizing fluid issuing within, and concentric with the jet of oil. This action continues at a predetermined rate so long as the oil remains in the state of a fog, so that the necessary time contact or time factor, of the oil with the catalyzer is secured, while the oil which condenses or agglomerates to a discrete or concrete form, is quickly ejected through the porous walls of the drum.

In the above described apparatus, when using nickel as a catalyzer, it is preferable to have the container of nickel, or suitably nickel coated if of iron or steel, as iron in the presence of nickel sometimes shows a tendency toward anticatalytic action.

What I claim is:—

1. The process of treating oily materials containing unsaturated bodies, which comprises forming said oily materials into an atomized condition, and bringing the oil fog thereby produced into contact with hydrogen and a freely porous catalytic body, constantly maintained substantially free from a sealing coat of oil.

2. The process of treating oily materials containing unsaturated bodies, which comprises forming said oily materials into an atomized condition, bringing the same into shifting contact with hydrogen and a porous catalytic body, constantly maintained substantially free from a sealing coat of saturated oil, and removing said oily material in a non-atomized state from said catalyzer.

3. The process of treating oily materials containing unsaturated fatty bodies, which comprises forming said oily materials into an atomized condition, and bringing the same into shifting contact with a moving catalytic body constituting a freely permeable bed constantly maintained substantially free from a sealing coat of saturated oil, and whose interior surfaces are in free contact with hydrogen.

4. The process of treating oily materials containing unsaturated bodies, which comprises forming said oily material into an atomized condition, and in the presence of hydrogen-containing gas, bringing the atomized oil into contact with a porous catalytic body, maintained substantially free from a sealing coat of saturated oil.

5. A process of treating oily material containing unsaturated bodies which comprises atomizing said oily materials, and passing the same through a penetrable mass containing a catalytic agent maintained substantially free from a sealing coat of saturated oil, and allowing hydrogen to contact with said catalytic agent.

6. A process of hydrogenating oil, which comprises continuously supplying oil and hydrogen into contact with a catalyzer, thereby causing the reduction of the oil, maintaining said catalyzer substantially free from a sealing coat of hydrogenated oil and continuously revivifying the catalyzer, and withdrawing the hydrogenated product, from the catalyzer in a liquid state.

7. A process of hydrogenating oil, which comprises supplying oil in an atomized condition and hydrogen to a closed chamber, passing the oil through a catalyzing material carried by a foraminous member pervious to oil and hydrogen and impervious to said catalytic material and withdrawing the hydrogenated product, while maintaining at least the major portion of the catalyzing material at a temperature below the boiling point of the product.

8. A process of hydrogenating oil which comprises atomizing oil, continuously passing at least one portion of the said atomized oil through a catalyzer in one direction while providing contact between at least a portion of said catalyzer and hydrogen to reduce the oil, and immediately and continuously passing in the same direction, the reduced product of said portion of oil through a foraminous member in contact with said catalyzer, said member being pervious to oil and hydrogen but impervious to the catalyzer, to separate the hydrogenated oil and the catalyzer from each other.

9. In the hydrogenation of oil the herein described step which comprises atomizing an oil containing unsaturated bodies into contact with a moving catalyzer carried by a foraminous member through which oil and hydrogen can pass, but through which the catalyzer can not readily pass, removing the hydrogenated oil directly from the catalyzer through said foraminous member, constantly revivifying said catalyzer, and maintaining hydrogen in contact with at least a portion of said catalyzer.

10. A process of hydrogenating oil which comprises passing atomized non-vaporized oil through a retainer pervious thereto and containing a catalyzer to which said retainer is impervious, at least a portion of said catalyzer being in contact with hydrogen.

11. A process of hydrogenating oil which comprises atomizing oil, passing the portion thereof coming from a given atomizer continuously in one direction through a retaining device pervious thereto, containing a catalyzer to which it is impervious, and providing contact between at least a portion of said catalyzer and hydrogen, while maintaining at least the major portion of said catalyzer at a temperature below the boiling point of the product.

12. An apparatus for hydrogenating oil comprising a chamber, a structure therein comprising a catalyst and a material pervious to oil and hydrogen, but not pervious to the catalyst, means by which the oil may be forced through said catalyst and said pervious material, while in contact with an atmosphere containing free hydrogen, a hydrogen inlet to said chamber, and an atomizer for directing the oil against said structure.

13. A process of hydrogenating oil which comprises atomizing oil, passing said atomized oil into contact with and through a body of substantially pure, metal-containing, catalyzing material, while at least a portion of said catalyzing material is in the presence of hydrogen, and withdrawing the hydrogenated product free from admixture with said catalyzing material.

14. A process of hydrogenating oil, which comprises continuously supplying an atomized oil into a chamber, continuously passing said oil through a body of catalyzer, at least a portion of which body is in contact with hydrogen to reduce the oil, and removing the reduced product.

15. A process of hydrogenating oil which comprises sustaining a catalyzing material within a foraminous supporting member impervious to said material but pervious to oil and hydrogen and continuously passing oil in an attenuated condition through said catalyzer and said member, while at least a portion of said catalyzer is in the presence of hydrogen, to reduce said oil, while maintaining at least the major portion of the catalyzer below the boiling point of the product.

16. A process of hydrogenating oil, which comprises forcing oil in an atomized, finely divided condition, through a mass of catalyzing material, at least a portion of which is in the presence of hydrogen, and thereby reducing the oil without mixing the catalyzer with the product, and maintaining at least the major portion of said catalyzing material at a temperature below the boiling point of the product.

17. An apparatus for hydrogenating oil comprising a closed casing having a body of catalyst therein, a plurality of pipes extending into the chamber formed by said casing, a nozzle on a plurality of adjacent pipes for atomizing the oil, means for rotating the said body of catalyst relatively to the said nozzle, and a receptacle pervious to oil and hydrogen, but impervious to catalyst, for retaining the catalyst.

18. A process of hydrogenating oil, which comprises continuously atomizing oil, continuously passing the atomized oil, while at least a portion thereof is in the presence of free hydrogen, through a catalyzing material confined within material impervious to the catalyzing material and pervious to oil and hydrogen to reduce the oil, and withdrawing the hydrogenated product.

19. A process of hydrogenating oil which comprises continuously supplying and atomizing oil, continuously passing the resulting atomized oil toward and through a catalyzing material confined against admixture with the product while at least a portion of said catalyzing material is in the presence of hydrogen.

20. A process of hydrogenating oil which comprises introducing oil under pressure into a chamber, atomizing the oil therein, forcing the atomized oil through a catalyzer a portion at least of which is in the presence of hydrogen, withdrawing the hydrogenated product from the chamber, and maintaining at least the major portion of the catalyzer at a temperature below the volatilizing point of the product.

21. A process of hydrogenating oil which comprises separately introducing hydrogen and oil under pressure into a chamber, atomizing the oil, forcing the atomized oil into contact with and through a mass of catalyzing material, at least a portion of which is in the presence of hydrogen, said material being held in a support impervious thereto but pervious to oil and hydrogen.

22. The herein described process of hydrogenating oil, which comprises continuously directing a flowing current of atomized oil in a closed chamber upon a body comprising a catalyzing material held by a material impervious thereto, forcing the oil through said catalyzing material and said material impervious thereto while a portion of said catalyzing material is in the presence of hydrogen, and withdrawing the hydrogenated product from said chamber, and maintaining a temperature in the reacting chamber below the vaporizing point of the product.

23. The herein described process of hydrogenating oil which comprises directing a flowing current containing atomized oil in a closed chamber upon successive portions of the surface of a structure containing a catalyst held within a retaining material impervious thereto but pervious to oil and hydrogen, thereby bringing said oil in contact with successive portions of said catalyst, and into contact with and through said retaining material while at least a portion of said catalyst is in the presence of hydrogen, continuously withdrawing the hydrogenated product from contact with the catalyst and maintaining a temperature within the closed chamber below the vaporizing point of the product.

24. The herein described process of removing films of oil from a catalyzer which comprises subjecting said catalyzer to centrifugal force sufficient to throw out drops of oil from said catalyzer, while directing steam against said catalyzer.

25. The herein described process, which consists in first atomizing a stream of oil into a mist without gasification, while in a closed chamber, then bringing such mist into contact with a catalyzer so confined that oil may pass through without carrying the catalyzer, while providing contact between hydrogen and at least a part of said oil, whereby the oil is reduced, and withdrawing the hydrogenated product from said chamber.

26. A process of hydrogenating oil which comprises passing oil through a structure comprising a foraminous supporting member carrying catalytic material, said member being pervious to oil and hydrogen, but impervious to said catalytic material, while at least a portion of said catalytic material is in the presence of hydrogen, and below the vaporizing point of the product.

27. A process of hydrogenating oil which comprises continuously atomizing oil, continuously passing the atomized oil while at least a portion thereof is in the presence of free hydrogen, through a catalyzing material confined within a container impervious to the catalyzing material but pervious to oil and hydrogen to reduce the oil, withdrawing the hydrogenated product from contact with the said catalyzing material, and maintaining at least the major portion of the catalyzing material at a temperature below the boiling point of the product.

28. An apparatus for hydrogenating oil comprising a closed chamber, a catalyzing material placed therewithin, and a retainer impervious to said material surrounding the same, at least a part of which is pervious to oil and hydrogen, and means for atomizing the oil and for directing the said atomized oil into contact with and through said catalyzing material, and a hydrogen inlet for said chamber.

29. An apparatus for hydrogenating oil comprising a closed casing, a pervious catalyzing material therein, means pervious to oil and hydrogen for sustaining and confining said catalyzing material, nozzles in said casing for atomizing oil and for directing the atomized oil against said catalyzing material, means for moving the catalyzing material and the nozzles relative to each other, said casing being provided with a hydrogen inlet.

30. An apparatus for hydrogenating oil comprising a closed casing, a pervious body of catalyzing material therein, a foraminous holder for sustaining and confining said body, a nozzle for atomizing oil, means for moving said nozzle, and said body of catalyzing material relatively to each other.

31. In an apparatus for hydrogenating oil, the combination of a pressure-tight receptacle provided with a hydrogen inlet, a supporting member therein, pervious to oil and hydrogen, a metal-containing catalytic substance supported thereupon, means for atomizing oil against the structure embodying said catalyzing substance and supporting member, and means for causing the oil to travel therethrough, and means for causing the catalytic substance and the hydrogen inlet to move relatively to each other, and means for withdrawing the treated oil from said receptacle.

32. An apparatus for hydrogenating oil comprising a closed casing, a foraminous container therein, surrounding a catalyst, an atomizing nozzle within said container for directing a stream of atomized oil against said catalyst, and means for directing the atomized oil from said nozzle against successive portions of said container and into contact with successive portions of said catalyst.

33. A process of hydrogenating oil which comprises continuously atomizing oil, continuously passing the atomized oil while at least a portion thereof is in the presence of free hydrogen through a catalyzing material.

34. In the hydrogenation of fatty oils comprising the glycerids of unsaturated fatty esters, the step of passing such oils, in a non-volatile, highly attenuated condition and while at least a portion thereof is in the presence of hydrogen, through a catalyst maintained free from a sealing coat of saturated oil.

35. The step of passing an oil containing unsaturated fatty acid esters, in the form of a mist of fine particles, into and through a body of catalytic material, while in the presence of an atmosphere containing free hydrogen, while mechanically preventing an accumulation of a sealing coat of saturated fatty bodies.

36. In the hydrogenation of oils, the step of atomizing the oils by means of steam, and passing the fine particles thereby produced, in the presence of hydrogen, into contact with a hydrogenating catalyst.

37. In the hydrogenation of fatty oils, the step of atomizing oily material against a catalyst and maintaining at least the major portion of said catalyst at all times substantially free from a sealing coat of hydrogenated oily material, and maintaining at least the major portion of said catalyst below the vaporizing point of the product.

Signed at Montclair in the county of Essex and State of New Jersey this fourth day of June A. D. 1912.

ADOLPHUS HENRY NEY.

Witnesses:
A. A. WELLS,
HEDWIG VON GOEBEN.